Dec. 11, 1962  J. B. BRUSH  3,067,439
FOLDABLE CATAMARAN

Filed June 10, 1958  6 Sheets-Sheet 1

INVENTOR.
John B. Brush.
BY
Wood, Herron & Evans.
ATTORNEYS.

Dec. 11, 1962 — J. B. BRUSH — 3,067,439
FOLDABLE CATAMARAN
Filed June 10, 1958 — 6 Sheets-Sheet 3

INVENTOR.
John B. Brush.
BY Wood, Herron & Evans.
ATTORNEYS.

Dec. 11, 1962     J. B. BRUSH     3,067,439
FOLDABLE CATAMARAN
Filed June 10, 1958     6 Sheets-Sheet 4
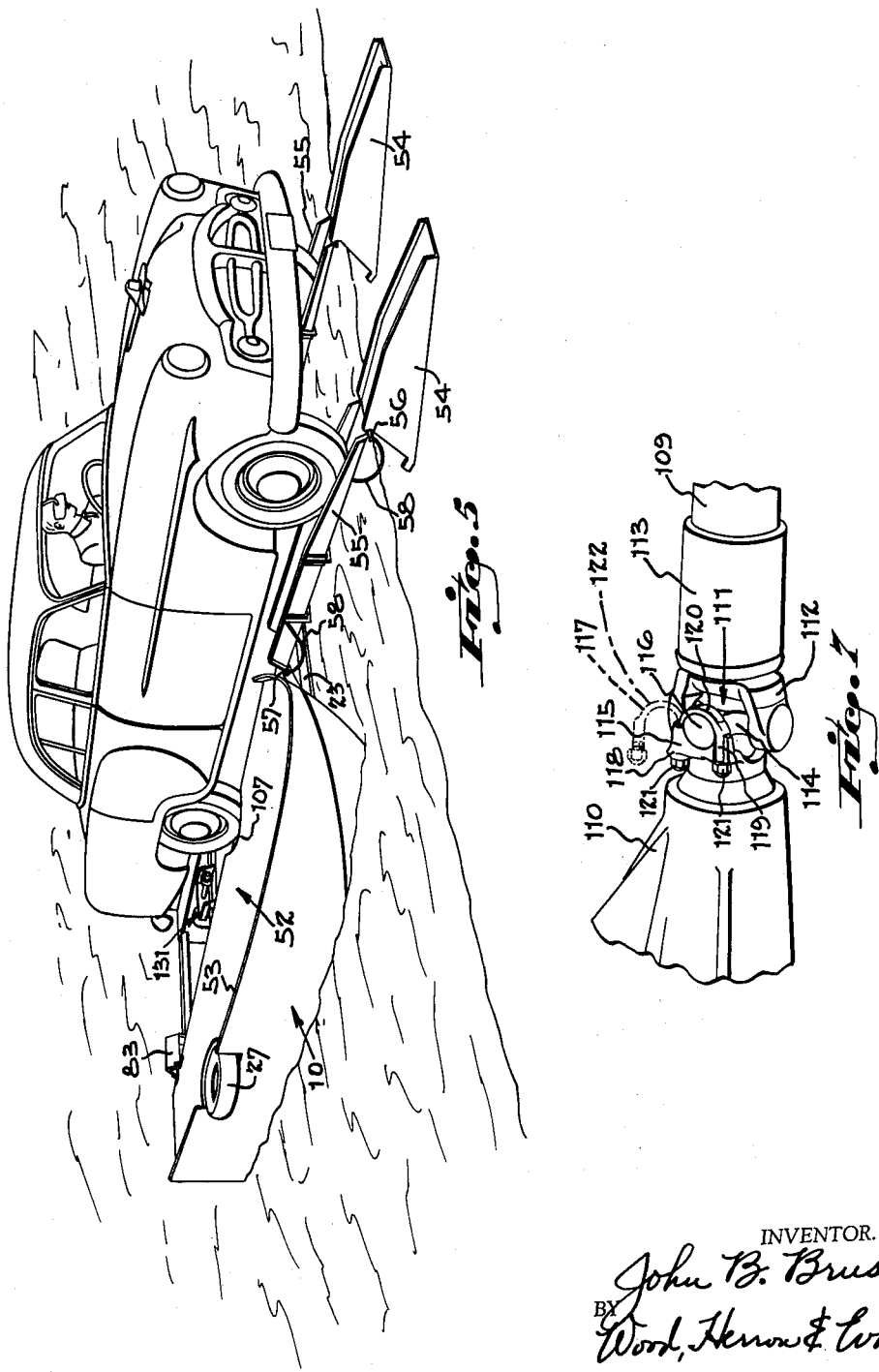
INVENTOR.
John B. Brush.
BY
Wood, Herron & Evans.
ATTORNEYS.

Dec. 11, 1962  J. B. BRUSH  3,067,439
FOLDABLE CATAMARAN
Filed June 10, 1958  6 Sheets-Sheet 5
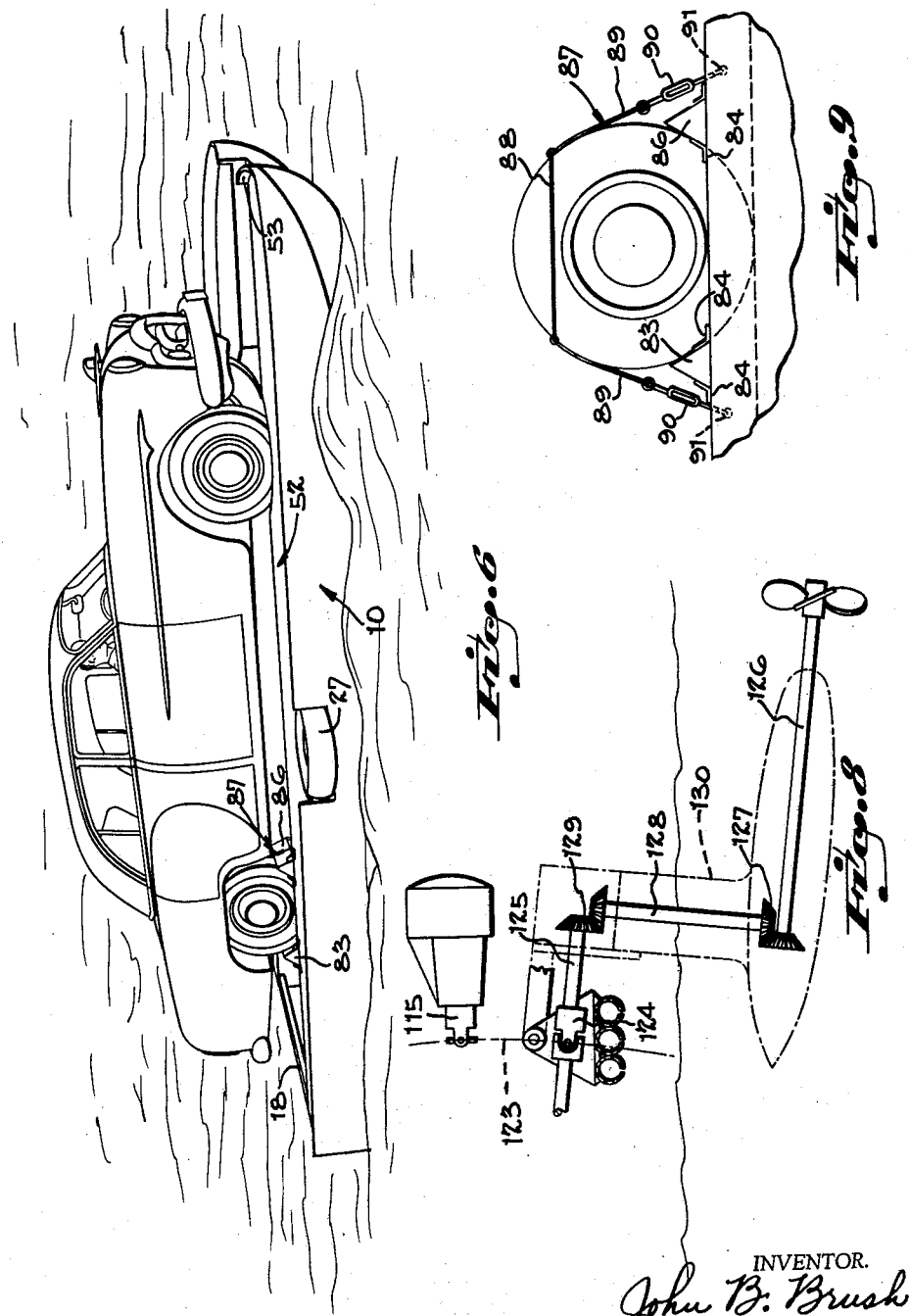
INVENTOR.
John B. Brush.
BY Wood, Herron & Evans
ATTORNEYS.

Dec. 11, 1962   J. B. BRUSH   3,067,439
FOLDABLE CATAMARAN

Filed June 10, 1958   6 Sheets-Sheet 6

INVENTOR.
John B. Brush.
BY
Wood, Herron & Evans.
ATTORNEYS.

Patented Dec. 11, 1962

3,067,439
FOLDABLE CATAMARAN
John B. Brush, 2 Beech Knoll Drive, Cincinnati, Ohio
Filed June 10, 1958, Ser. No. 741,110
4 Claims. (Cl. 9—1)

This invention relates to boats, and it is directed in particular to boats of the catamaran class.

Typically, a catamaran consists of two hulls which are arranged side by side and joined by a framework of some sort which may support a mast, deck structure, a cabin, a power unit or various combinations of these things, depending upon the intended use of the boat. Regardless of its intended use, the overall width or beam (which includes the twin hulls and the space in between them) of a catamaran of any practical size, is substantially greater than the width of an ordinary automobile. Consequently, it is impossible to trail a catamaran behind an automobile in the same way that a small pleasure boat is adapted to be trailed, because the hulls project substantially beyond the sides of the automobile and create a traffic hazard on roads.

With this in mind, it has been an important objective of the invention to provide a catamaran which may be folded so as to decrease its overall width to a point where it may be trailed safely behind an automobile with the same driving care one uses with an average outboard runabout.

Another objective of the invention has been to provide a foldable catamaran incorporating wheels which rest upon the ground when the boat is folded so that the boat structure may ride upon these wheels, it being unnecessary to provide a trailer as such for transporting the catamaran from place to place.

In the fulfillment of the above objectives I provide a catamaran which mounts two wheels outboard of the sides of the twin hulls. The boat structure is adapted to be folded such that the bottoms of the two hulls are positioned adjacent to one another. This decreases the overall width or beam of the boat to the extent required for safe trailing, and it also positions the two wheels so that they, along with the folded boat, constitute a "trailer" structure which can be attached by means of a draw bar and an ordinary trailer hitch to the rear of an automobile.

Another objective of the invention has been to provide a foldable catamaran of the type set forth which floats freely while it is in the folded condition. In the preferred embodiment, each hull is hollow and completely watertight. The two hulls are joined by framework which is laterally rigid. The inboard sides of the hulls are hinged to this framework, and they swing down and undereneath the framework in order to fold. Thus, the folding interferes in no way with anything mounted upon the framework so that the boat is adapted for a number of different uses. More importantly, however, the hulls, being watertight, float upon their sides when the boat is backed into the water at a launching site. With the hulls floating freely, the boat may be unfolded by swinging the two hulls simultaneously out into their normal floating positions.

Preferably, and in the preferred embodiment of the invention, means are provided for moving the hulls between their folded and unfolded positions from a remote point, such as from the shore at the launching site. Thus, the boat may be unfolded or folded while the hulls are afloat, and it is not necessary for a person to wade into the water at the time of launching or at the time the boat is to be pulled from the water.

Another important objective of the invention has been to provide a foldable catamaran of the type set forth which is adapted to carry an automobile and to be powered by the automobile. Thus, the boat of this invention may be trailed behind an automobile to a launching site. The automobile then may be driven aboard the boat, the two becoming in effect a "cruiser." At the launching site the folded boat is backed into the water and while it is still attached to the automobile by means of the draw bar, the two hulls are unfolded. Each hull includes a track for the front and rear wheel at one side of the automobile. These two tracks are automatically positioned directly behind the wheels of the automobile they are to receive when the boat is launched and unfolded as described above with the boat attached by the draw bar to the automobile. Removable ramps are provided and these ramps are so arranged that they extend from the tracks on the hulls to positions immediately in back of the two rear wheels of the automobile. These ramps preferably are put in place while the draw bar is still attached so that upon removal of the draw bar, the automobile may be backed directly upon the catamaran with complete assurance that the wheels of the automobile are in direct alignment with the tracks on the hulls.

A further objective of the invention is to provide a catamaran boat adapted to carry an automobile with the wheels at one side of the automobile resting upon one of the hulls and with the wheels at the other side of the automobile resting upon the other hull, and with the means which foldably join the two hulls being adapted to permit one hull to pitch relative to the other so that relative pitching in conjunction with the springs and shock absorbers of the automobile insulate the passenger compartment from the effects of waves and absorb the jarring effects of the movement of the boat over choppy water.

A further objective is to provide a propeller drive assembly for a boat of the type set forth which is adapted to be connected directly to the drive shaft of an automobile. In the past it has been proposed to drive various types of boats by means of an automobile in which provision is made for taking the driving power from both of the rear wheels of the automobile. This has meant, of course, that the torque from the drive shaft had to be transmitted through the differential and rear axle and then through the wheels with an attendant loss of horsepower. In the present instance, a unique quick connect-quick disconnect coupling is provided for the universal joint at the rear of the drive shaft of the automobile so that the drive shaft may be disconnected from the automobile differential and lowered into position to be coupled, by means of a duplicate quick connect-quick disconnect coupling to the propeller drive shaft. In addition to a savings in horsepower, this type of drive has a number of other advantages. For example, the rear wheels of the automobile may be securely anchored to the hulls of the boat leaving the springs and tires effective to absorb the forces of waves. This coupled with the boat construction which permits one hull to pitch relative to the other, provides an unusually smooth ride for the occupants of the automobile.

Following past suggestions, the front wheels of the automobile rest upon small turntables which are built into the hulls of the boat. These turntables are connected by means such as cables to the rudder of the boat so that the steering wheel of the automobile may be used to steer the boat. Due to the weight of the automobile engine and the fact that the rear wheels are anchored securely in place it has been found that it is not necessary to also anchor the front wheels to the turntables. However, it is found that the springs and shock absorbers of the front wheel suspension system are completely effective, as in the case of the back wheels, to absorb the forces of waves. Thus, when the boat is on water it may be operated from the driver's seat and due to the hull construction and the way in which the automobile is anchored in place on the hulls, the driver and the passengers of the automobile may ride smoothly over rough, choppy water, the hulls, springs and tires of the automobile absorbing the forces of the waves.

In summary, therefore, it may be seen that the invention has various, although closely related, aspects. Basically it concerns a foldable catamaran. The hulls of the catamaran may be shaped, following known design techniques, to best adapt them to particular uses. In addition, the framework which connects the hulls may mount a mast or masts with provision being made to unstep the masts, if it is desired to provide a sailing catamaran. Furthermore, the framework may serve as a base to mount a cabin which may be powered either with an inboard or an outboard motor. Additional hull and superstructure designs may, of course, be employed, utilizing the foldable structure disclosed here.

The invention also contemplates a foldable catamaran which, when in the folded condition, becomes a trailer so that it may be transported over roads. The invention also contemplates a catamaran adapted to carry and to be powered by an automobile. Additionally, the invention concerns a catamaran design in which one hull is permitted to pitch relative to the other with a large mass (which may be a motor, a passenger compartment or both) mounted upon the framework connecting the two hulls by means of springs so that the spring, in combination with the relative pitching permitted between hulls insulates the mass from forces applied to the hulls while moving through rough water. This last aspect of the invention has particular utility in a catamaran designed to move at a relatively high rate of speed and is particularly applicable to a catamaran, the hulls of which are designed for planing on top of the water when the boat is moving at a relatively high rate of speed.

Other objectives and advantages of the invention will be readily apparent to those skilled in the art from the following detailed description of the drawings in which:

FIGURE 5 is a perspective view showing an automobile being backed onto the catamaran at a launching site.

FIGURE 6 is a perspective view of the catamaran with an automobile mounted upon it and being driven by the automobile.

FIGURE 7 is a fragmentary perspective view showing a preferred form of quick connect-quick disconnect coupler which may be used for attaching the rear end of the drive shaft of an automobile to the drive shaft of the propeller of the catamaran.

FIGURE 8 is a fragmentary diagrammatic view illustrating the way in which the rear end of the drive shaft may be shifted from its normal connection to the differential of the automobile into connection with the drive shaft of the propeller of the catamaran.

FIGURE 9 is a fragmentary side elevational view illustrating a preferred means for anchoring the rear wheels of an automobile to the deck of one of the hulls of the catamaran.

Figures 1, 2:
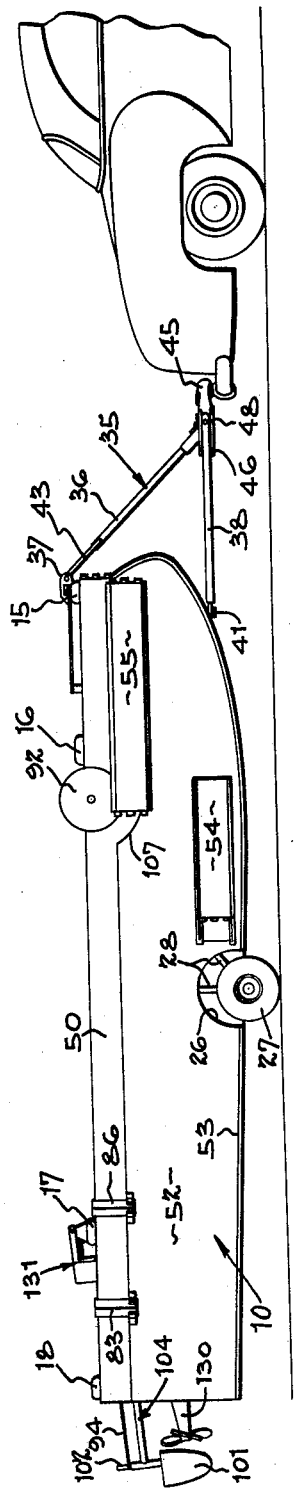
FIGURE 1 is a side elevational view of a catamaran incorporating the principles of this invention showing the catamaran attached to the rear of an automobile in condition for trailing.
FIGURE 2 is a perspective view showing the catamaran in condition for being trailed behind an automobile.

The catamaran of this invention consists essentially of twin hulls designated generally 10 and 11, hull 10 being at the right side of the boat and hull 11 being at the left side of the boat. The two hulls are fastened together by laterally rigid frame members designated generally by the numeral 13, which join the gunwales of the two hulls, and tension members designated 14 which, in the embodiment of the invention shown, join the two hulls at their chine lines.

As shown, the laterally rigid frame members are four in number. Starting from the bow these frame members and their locations are shown respectively at 15, 16, 17 and 18. Also in the instance shown, the frame members consist of the lengths of tubing. In the cases of frame members 15 and 18 at the bow and stern of the boat respectively two tubes are employed, whereas in the intermediate frame members 16 and 17 three tubes are employed. The tubes in each case are parallel to one another and each tube is slit on the underside for the major part of its length so that the tubes may twist as will be explained. Furthermore, it is preferred that the ends of the tubes for each frame member be closed as shown in FIGURES 1 and 2 by providing cap pieces which are welded directly to the ends of the tubes, the cap pieces spanning both tubes in the case of the bow and stern frame members 15 and 18, and spanning all three of the tubes of the intermediate frame members 16 and 17. The welding of the caps to the tubes joins them securely while permitting the twisting to which reference has been made. As best appears in FIGURES 10 and 11, each end of each cross member is welded to one leaf 19 of a hinge designated 20. The other leaf, designated 21 of the hinge 20 is affixed to a hull along a gunwale and thus with four frame members shown there are eight hinges of the type described and the hinges are arranged so that the two hulls can be pivoted on the hinges to swing into positions in which they are bottom to bottom below the frame members, this position being shown in FIGURE 10.

Figure 10:
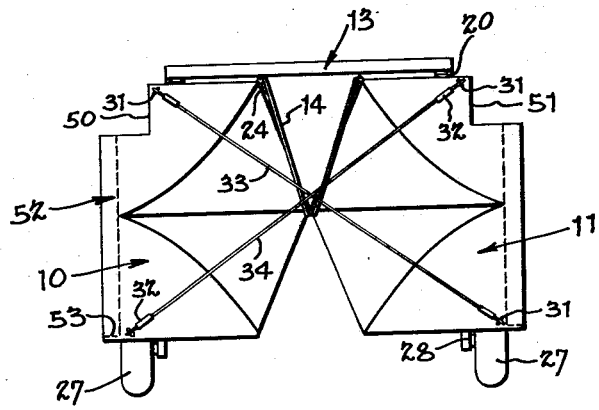
FIGURE 10 is a semi-diagrammatic front elevational view of the catamaran in folded condition.
Figure 11:
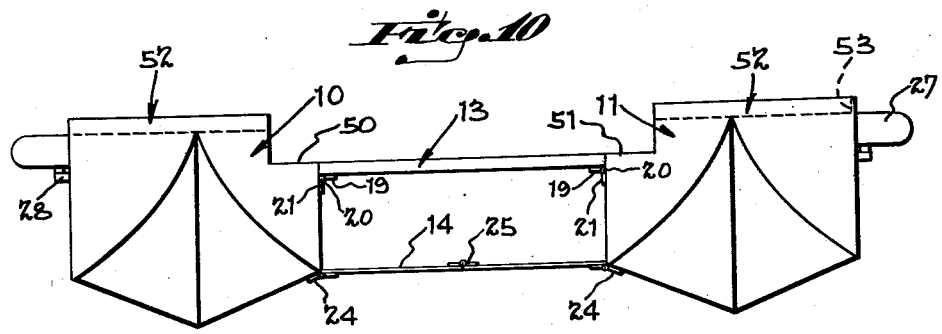
FIGURE 11 is a semi-diagrammatic front elevational view of the catamaran showing it in unfolded condition with the two hulls in normal floating attitude.

Two tensioning members such as the one indicated at 14 in FIGURE 11 are employed. One of these tensioning members joins the two hulls at their chine lines below the frame member 17. The position of this tensioning member is shown at 22 in FIGURE 3, the other tensioning member is shown at 23 in FIGURE 5. The opposite ends of each tensioning member are hinged to the hulls by means of hinges 24—24. Additionally, each tensioning member is hinged at its mid-line as shown at 25 so that the tensioning member breaks downwardly along its center line when the two hulls are folded bottom to bottom as illustrated in FIGURE 10. It will be apppreciated that the boat under load conditions will maintain the tensioning members in the straight condition illustrated in FIGURE 11.

The frame members shown are intended to be representative only. More or less may be utilized depending upon the size and the intended function of the boat. The frame members shown may serve as base framework for a cabin or other structure as dictated by the intended use of the boat. The specific hull design which is shown may be modified to adapt it to specific uses. The shallow V bottom shown is primarily utilitarian in nature and is representative only of a number of different designs which will be apparent to those skilled in the art. Obviously, for sailing purposes the hulls may be substantially narrower and deeper, whereas if it is desired to power the boat by a motor for traveling at high rates of speed, the bottoms of the hulls may be substantially flat or even stepped for planning purposes. It is preferred, however that each hull be completely enclosed and water tight as illustrated and appropriate bulkheads (not shown) may be used in each hull to provide a plurality of water tight compartments for safety.

Each hull, at its outboard side just below the gunwale, has a semi-circular well 26 formed in it in which a pneumatically tired wheel 27 is mounted by means such as shock struts 28. These shock struts may be fabricated following known techniques of the aircraft industry and it is believed unnecessary to either show or describe them in detail. As shown, a little more than one-half of each wheel is exposed outboard of each hull. When the catamaran is in the folded condition illustrated in FIGURES 1, 2 and 10, the two wheels rest upon the ground and provide, with the folded boat, a trailer structure. When the catamaran is unfolded and in the floating condition illustrated in FIGURE 11 the two wheels constitute bumpers or fenders and it is preferred, for this reason, that they remain in place while the boat is on the water. Obviously, if desired the two wheels can be arranged so that they can be removed or retracted when the boat is afloat.

A crank operated system, to be described later, is provided to assist in the folding and unfolding of the boat. However, when the boat is folded and in trailing condition the two hulls are secured by means of two pairs of cables, one pair being located at the stern and the other pair being located at the bow. The two cables of the pair at the stern are designated 29 and 30. These cables are arranged in crossed relation with one cable joining the inboard gunwale of the hull at the left to the outboard gunwale of the hull at the right. The other cable joins the inboard gunwale of the hull at the right to the outboard gunwale of the hull at the left. Appropriate hooks such as those designated 31 are permanently fastened in place to the hulls and the ends of the cables are provided with eyes which engage the hooks. Additionally, one or more turnbuckles 32 are provided in the cable lines, the turnbuckles being loosened when the cables are to be disengaged and tightened after engagement. The two cables of the pair at the bow are designated 33 and 34. These cables are also arranged at the crossed relation and hooks 31 and turnbuckles 32 are employed.

Figure 4:
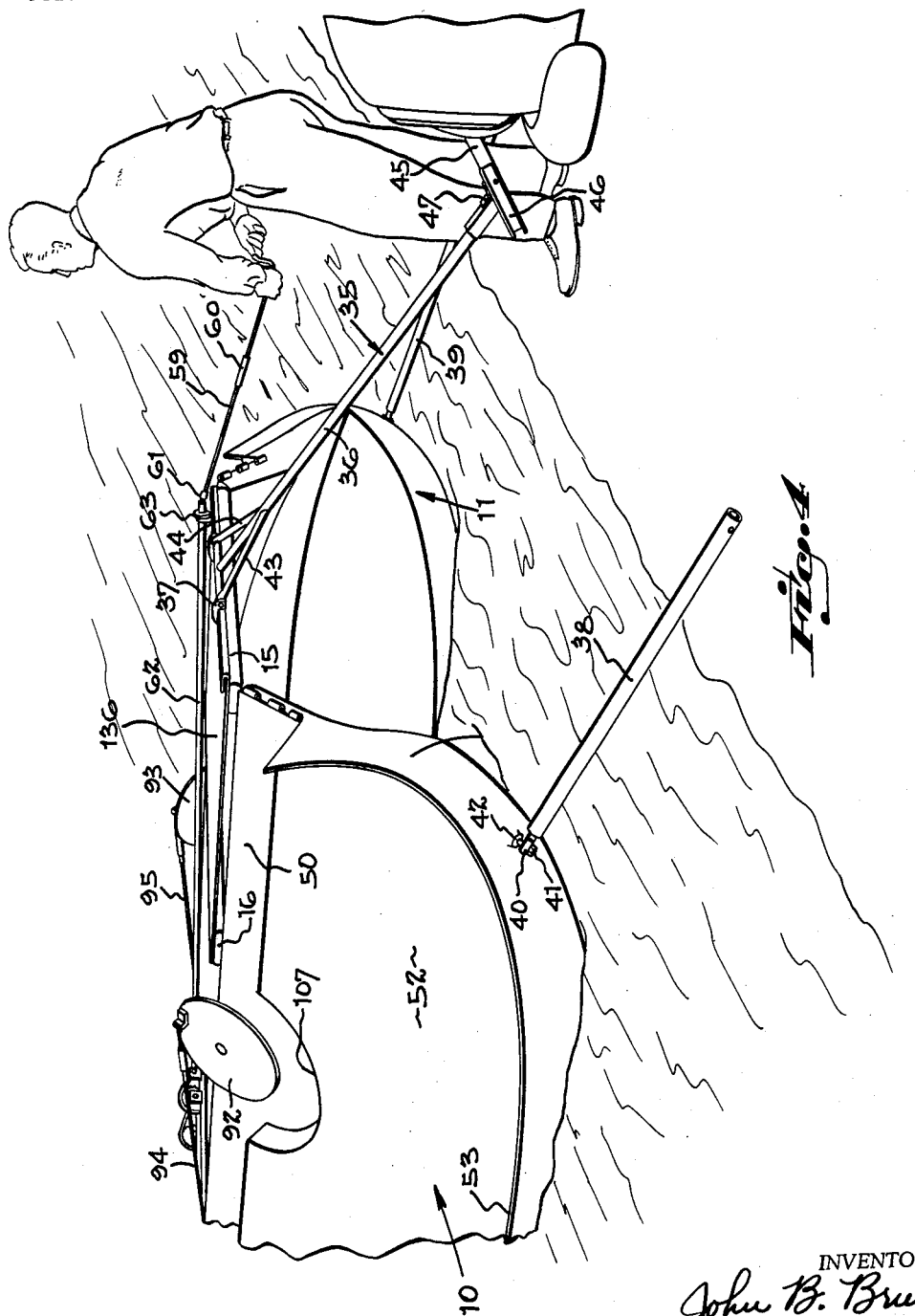
FIGURE 4 is a fragmentary perspective view illustrating the manner in which the twin hulls of the catamaran may be folded or unfolded while they are floating upon the water at a launching site.

A tow bar assembly 35 is secured to the bow of the boat. It is preferred that the two bar assembly may be constructed as shown utilizing three tubular members, one of which, indicated at 36, is pivotally attached by means of a bracket 37 to the forward frame member 15 of the boat. The other two tubular members are identified by 38 and 39 respectively, member 38 being attached to the right hull and member 39 being attached to the left hull. The attachment to the hull, in each instance, is by means of a ball socket 40 which is secured in place to the rear end of the tubing member. A ball and bolt 41 fastens into a bushing 42 which is welded or otherwise affixed to the hull. As shown in FIGURE 4, the end of tubular member 36 which is pivoted on bracket 37 may be rigidified by two side braces 43—44. Member 36 can be telescoped. The numeral 45 identifies a trailer hitch which, at its forward end may be of conventional construction. The rear part of the hitch is modified by mounting two channel members 46—46 at the sides thereof, only one of which is shown in FIGURE 4, this channel member being angulated to receive the forward end of tubular member 38. The other side of the trailer hitch carries a similar channel member and it is angulated to receive the forward end of tubular member 39. The forward end of the tubular member 36 is hinged to the trailer hitch as indicated at 47. The two channel members 46—46 of the hitch 45, and the forward ends of tubular members 38 and 39 are apertured to receive two pins 48 by means of which the tubular members 38 and 39 may be removably secured to the hitch. It may be appreciated therefore, that with the catamaran in folded condition as shown in FIGURES 1, 2 and 10 and the draw bar assembly attached to the trailer hitch, the boat may be towed from place to place with no more difficulty than the towing of a small pleasure boat.

Various adjustments and modifications may be made in the two bar assembly. For example, the other tubular members may be made to telescope, with appropriate locks being provided, to position the boat relative to the automobile. An expedient of this type is helpful in launching under certain conditions and particularly in the launching of a catamaran designed to carry an automobile as will be explained.

The hulls which are shown in the drawings are designed specifically to carry an automobile. For this purpose the inboard side of each hull is stepped down, as best appears in FIGURE 11, to provide a track or ramp for the wheels of the automobile. The ramp on the right hull 10 is designated generally by the numeral 50. The ramp on the left hull 11 is designated generally 51. The ramps may extend the full lengths of the hulls as shown. Although it is not necessary that the ramps be at the inboard side of each hull, this arrangement is preferred, because it provides a substantially wide deck area, indicated generally at 52, at each side of the automobile when it is on board the craft. It is preferred that a permanent gunwale 53 be installed around the outside of each deck extending from the ramp, around the bow of the hull, back to the well 26, and then continuing from the well to the stern of the hull. The gunwale 53 may include means for attaching removable railing structure if desired.

Removable ramps are provided over which the automobile may be driven onto the tracks 50 and 51. Each of these removable ramps is made in two parts. See FIGURE 5. One part indicated at 54, is designed to rest upon the shore. The other part indicated at 55, which preferably is channel shaped as shown, is designed to bridge the space between the part 54 and the hull of the boat. The two ends of the channel shaped ramp 55, the forward end of the ramp on the hull, and the rear end of the ramp part 54 are configurated to provide hinge joints which are connectable by means of removable hinge pins 56 and 57 respectively. Thus, the two channel-shaped ramps 55 may be attached to the hulls by aligning the hinge joints and inserting the two pins. The same thing may be done to connect parts 54 and 55. In each case the hinge pins are attached to the channel-shaped ramps by means of safety cables 58 so that they do not become lost. As shown, the two parts 54—54 of the removable ramps, which rest upon the shore, are wedge-shaped and they may be made, following aircraft fabrication techniques, of aluminum or other light weight material. The same type construction may be used for the parts 55—55. When the boat is folded, the parts of the removable ramp for the right hull are attached to the deck of the right hull as shown in FIGURES 1 and 2 by appropriate fasteners. The parts of the other removable ramp may be attached to the left hull in the same way.

Figure 3:
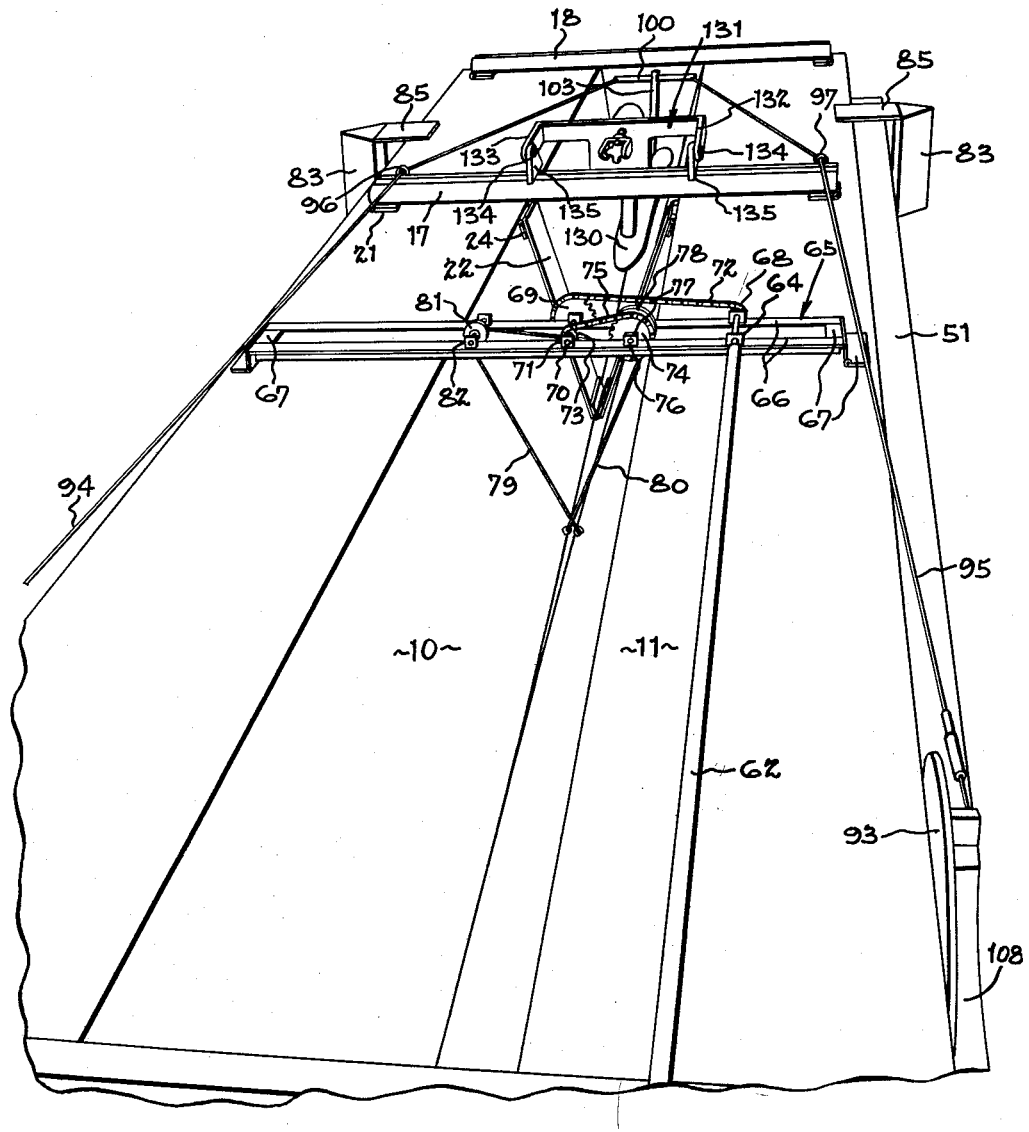
FIGURE 3 is a fragmentary perspective view looking back toward the stern of the catamaran while it is in folded condition.

Reference is now made to FIGURES 3 and 4. It is preferred that mechanical means be provided for folding and unfolding the boat while the hulls are afloat. In the instance shown, such folding and unfolding is accomplished by means of a crank 59. This crank may be substantially identical to the type commonly used for an automobile jack, including a locking sleeve 60 and a pivoted joint, covered by the sleeve, which permits the crank to be folded for storage purposes. The outer end of the crank is connectable as shown at 61 to the forward end of a rod 62 which extends from a journal bracket 63 on the forward frame member 15 to a journal bracket 64 which is mounted upon a cross frame indicated generally at 65, frame 65 being located near the fore and aft center of gravity of the boat. The frame, as shown, may consist of two angle bars 66 which are arranged in spaced parallel relation and fastened together at their ends by spacer plates. The opposite ends of the bars also mount hinges 67—67, which are similar to the hinges 20 and which are utilized to secure the cross frame 65 to the two hulls in the same way the frame members 15—18 are secured. The rear end of rod 62 has a small sprocket 68 keyed to it. A second, larger sprocket 69 is mounted upon a shaft 70 which is journalled in a bracket 71 on the cross frame in spaced parallel relation to rod 62. The two sprockets 68 and 69 are joined by a pitch chain 72 so that when the rod 62 turns, the shaft 70 turns. Shaft 70 also mounts a small sprocket 73 which is in driving connection with a larger sprocket 74 by means of a pitch chain 75. The latter sprocket is mounted upon a shaft 76 journalled in brackets 77, and it is affixed to a cable drum 78, also journalled upon shaft 76. Two cables designated 79 and 80 are attached to cable drum 78. The free end of one of these cables is fastened to the bottom of the right hull 10, whereas the free end of the other cable is fastened to the bottom of the left hull 11. Cable 80 goes directly from the drum 78 to the bottom of hull 10. The other cable 79 passes over a pulley 81, which is journalled in a bracket 82 on the cross frame and thence to the bottom of hull 11. From FIGURE 3 it may be seen that rotation of rod 62 by means of crank 59 in a clockwise direction as shown will pay out the two cables 79 and 80 from the cable drum 79, whereas the turning of the rod in the opposite or counter-clockwise direction will wind the two cables 79 and 80 onto the drum. Thus, with the hulls afloat in folded condition and with the two pairs of cables at the stern and bow removed, the crank may be rotated in a clockwise direction which permits the two hulls to float out away from one another as shown in FIGURE 4 and fold out into their normal floating positions which is illustrated in FIGURE 11. By turning the crank in the opposite direction the two hulls may be floated in toward one another and turned bottom to bottom on their sides into the position shown in FIGURE 10. The unfolding operation, which will be explained in detail later in connection with the description of a typical launching, is done, as shown in FIGURE 4, after the two tubular members 38 and 39 of the tow bar assembly have been disconnected from the trailer hitch.

The location of an automobile upon the hulls to balance the boat in the fore and aft direction is dependent, of course, upon the center of gravity of the automobile utilized and the design of the hulls. This location may be determined experimentally and once it is established a pair of chocks 83—83 may be permanently attached to the hulls, extending across the ramps 50 and 51 at the backs of the rear tires. These chocks are simply triangular in shape and they may be affixed to the hulls by straps 84—84 bolted to the deck at their outboard ends and affixed by plates 85—85 bolted to the hulls at the inboard ends of the chocks. Thus, the automobile may be backed onto the hulls until the rear wheels contact the chocks 83—83. Once the automobile is in place, the rear wheels are blocked by mean of a second pair of chocks 86—86 which are removably fastened to the hulls. In this case, spring locking pins or other commonly known disconnectable fasteners may be utilized.

The rear wheels of the automobile are secured by two tie-down harnesses designated generally 87—87. Each harness includes a closed loop 88 which may be made of cable, two connecting cables 89—89, two turnbuckles 90—90 and two hooks 91—91. The closed loop is engaged over the top of the automobile tire. The cables 89—89 are attached to the loop, one at the front and one at the back of the tire, the attachment being centered, in each instance, on the tread of the tire. The lower end of each cable 89 is attached to one end of a turnbuckle and then the other end of the turnbuckle, which carries a hook 91, is secured to a ring bolt or other appropriate fastener attached to the hull. It may be seen, therefore, that when the two turnbuckles are tightened to draw the loop 88 down onto the top of the tire the automobile is securely anchored in place. It should be noted, however, that the two rear wheels are fastened independently of the axle so that the spring, shock absorber system, and tires of the automobile are effective.

The front wheels of the automobile rest upon two turntables, the one on the right hull being indicated at 92, and the one on the left hull being indicated at 93. These turntables are simply pivotally journalled in appropriate mountings in the hulls so that they constitute continuations of the ramps 50 and 51. Both turntables overhang the inboard sides of the hulls and two cables 94 at the right and 95 at the left are attached to them. These cables extend back along the inboard sides of the hulls and through guides 96 and 97 which are mounted upon the frame member 17. The rear ends of the cables are attached to the opposite ends of a rudder bar 100. The rudder itself is shown at 101 and it includes a rudder shaft 102 in which the rudder bar 100 is affixed crosswise adjacent to its upper end. The rudder shaft 102 is journalled for turning movement in a tube 103 which is welded or otherwise affixed to the rear end of a bracket designated generally 104. In the instance shown the bracket is made from a length of tubing 105 which is attached at its forward end to the frame member 17 and which is braced from frame member 18 by means of a vertical strut 106. The side walls of each ramp 50 and 51 are configurated to provided arcuate wells 107 at the right and 108 at the left to clear the front wheels of the automobile when they are turned. It may be seen, therefore, that the boat may be steered by the automobile steering wheel through the turntable and cable systems.

To insure that the turntables and the rudder are correctly aligned and held in this position when the automobile is driven onto the boat, removable pins (not shown) may be used, these pins extending through the turntables and into appropriate bores in the hulls and being so located that the turntables must be correctly aligned to center the rudder before the pins can be inserted. These pins also serve to secure the rudder when the boat is folded for trailing.

In the embodiment of the invention illustrated, the boat is driven directly from the driven shaft of the automobile, the drive shaft being shown fragmentarily only at 109 in FIGURE 7. A part only of the automoible differential is shown at 110 in this view. The universal joint through which the drive shaft is attached to the automobile differential is shown at 111.

It is preferred that the universal joint for the automobile be modified as shown in FIGURE 7 to provide a quick disconnect coupler. In the instance shown, the yoke designated 112 at the rear end of the automobile drive shaft 109, the sleeve shown at 113, and the cross 114 require no modification. However, rear yoke 115 is modified. As shown, a sleeve 118 of yoke 115 receives one arm of U-bolt 117. The opposite sleeve 119 is changed to a slot and it receives the other arm of the U-bolt 117. With the bolt tightened as shown in full lines in FIGURE 7, the connecting part designated 120 of U-bolt 117 embraces needle bearing 116 of cross 114. When the nuts 121—121 are loosened, the U-bolt may be disengaged from needle bearing 116 and swung up out of slot 119 into the position shown by dot-dash lines 112 to free the connector. The opposite U-bolt may be disconnected in a similar manner. The drive shaft 109 may be slid forward and the universal joint is then free to be swung down as shown diagrammatically by the arcuate line 123 in FIGURE 8. The elements of the universal joint are shown diagrammatically only in FIGURE 8. However, it will be appreciated that the universal joint is the same as shown in FIGURE 7 and also that a yoke 124 is provided at the forward end of a shaft 125 which is identical to the yoke 115 attached to the differential of the automobile. Where applicable, the same numbers are used to identify corresponding parts in both FIGURES 7 and 8.

Shaft 125 is part of the propeller assembly. The main propeller shaft is shown at 126 and it is connected through a pair of bevel gears 127 to a vertical shaft 128. The upper end of shaft 128 is in driving connection with shaft 125 through a pair of bevel gears 129. The three shafts 125, 126 and 128 may be journalled in appropriate bearings and enclosed within an appropriate housing shown diagrammatically only at 130. The housing preferably is streamlined in the fore and aft direction following conventional practice. Other means may be utilized to connect shaft 125 to the main propeller shaft 126, one expedient that has proved to be satisfactory is the use of belts and pulleys. The whole propeller drive assembly, including the housing, may be mounted upon a bracket, indicated generally at 131 in FIGURE 3, which bracket may included arms 132 and 133 which are pivotally mounted as at 134—134 upon struts 135—135 which are welded or otherwise affixed to frame member 17. The pivot mount is representative only of other ways of mounting the propeller including mounts which permit the propeller itself to be raised and lowered to facilitate launching at shallow beaches. Also, the propeller assembly may include an anti-cavitation plate (not shown).

In a typical launching, starting with the catamaran in folded condition for towing, the boat is backed to the water's edge. The two pairs of cross cables 29 and 30 at the stern of the boat and the two pairs of cables 33 and 34 at the bow of the boat then may be removed. The two sets of removable ramps 54—55 may also be removed from their positions of attachment to the decks of the hulls. The boat then may be backed into the water until the two wheels 27—27 float free of the bottom. After this, the two tubular connectors 38 and 39 of the draw bar assembly may be disconnected from the trailer hitch. At this time the crank 59 may be attached as shown in FIGURE 4 and the cables 79 and 80 payed out from cable drum 78 by turning rod 62 in a clockwise direction to permit the two hulls to float apart and into their normal floating attitudes illustrated in FIGURE 11. The two tubular members 38 and 39 of the tow bar assembly may be removed completely if desired. With the two hulls in floating attitude the removable ramps may be assembled as shown in FIGURE 5. This is done with the boat still attached to the trailer hitch, which automatically positions the boat such that the two ramps are close to and in alignment with the rear wheels of the automobile. If the body of water has a current in it it may be necessary to tie a rope from the side of the upstream hull to a point on shore upstream of the automobile to maintain the boat in alignment with the wheels. The tube 36 of the tow bar assembly may be uncoupled from the car by detaching and dropping trailer hitch 45 and the car backed up the ramp and onto the boat. Thereafter, the tow bar and trailer hitch may be swung straight up and held in this position by an appropriate tie, or it may be removed from the boat completely by disengaging mount bracket 37.

The automobile is stopped with its rear wheels in contact with the rear chocks 83—83 and then the forward chocks 86—86 are put in place. Following this, the tie-down harness may be fastened to the tires of the rear wheels. The propeller assembly is so positioned relative to the fastened down position of the automobile that the yoke 124 at the forward end of drive shaft 126 is in position to be coupled to the drive shaft of the automobile by the simple expedient of disconnecting it from yoke 115 on the differential of the automobile and lowering it as illustrated in FIGURE 8. To facilitate the engagement and disengagement of the drive shaft it is preferred that an opening be provided in the back floor of the automobile so that the quick disconnect coupling may be reached from the inside of the automobile. With the propeller thus connected to the engine of the automobile and with the front wheels resting upon two turntables 92 and 93 the turntables may be freed by disengaging the pins previously described and the boat is ready to be both powered and steered from the automobile.

A number of expedients may be employed to increase the enjoyment of the "cruiser" thus provided. For example, a deck plate 136 may be used to cover the area between hulls immediately in front of the automobile. The same type of expedient can be employed to cover the area between hulls at the rear of the automobile. Seats can be installed in the open trunk to increase the seating capacity of the "cruiser."

It has been found that an auxiliary cooling system is required for the automobile engine if it is to be operated at sustained high speeds. It is preferred that such cooling be accomplished by pumping water from the body of water over which the boat is travelling through a heat exchanger placed in the automobile cooling system. Such a heat exchanger is not illustrated inasmuch as its installation is believed to be within the expected knowledge of those skilled in the art.

Figure 12:
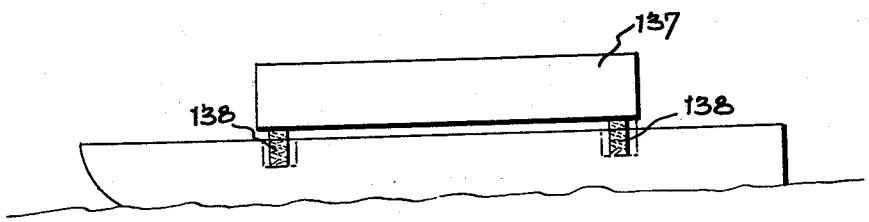
FIGURE 12 is a diagrammatic side elevational view illustrating one aspect of the invention in which a mass to be transported upon the catamaran is insulated from the hulls by means of a spring suspension system.

The diagrammatic view of FIGURE 12 is to be considered in conjunction with the other figures. This is a side view and therefore does not show twin hulls as such. The numeral 137 designates a mass or load. This mass or load, which may represent an automobile, cabinet structure, an engine, a passenger load or any substantial weight, is insulated from the hulls by means of spring and shock absorber assemblies 138 similar to those employed upon conventional automobiles. Furthermore, the spring and shock absorber assemblies work in conjunction with the relative pitching permitted between the two hulls by the hinge mounts and the twistable frame members so that a sudden shock on one hull is isolated in that hull and not transmitted to the mass 137. The ride for passengers is thus smoothed out and they are not subjected to the hammering effects of waves while the boat is driven at high speed on rough water.

Having described my invention, I claim:
1. A catamaran boat adapted to carry an automobile, said catamaran boat comprising two hulls which are arranged in spaced parallel relation, each hull configurated along its inboard side to provide a track for the wheels at one side of an automobile, first laterally rigid, twistable means interconnecting the tops of said hulls adjacent to their bows, second laterally rigid, twistable means interconnecting the tops of said hulls adjacent to their sterns, means interconnecting the hulls below their water lines to prevent the hulls from tipping toward one another when an automobile is placed upon them, and means to secure the wheels only of an automobile to the hulls to leave the springs of the automobile effective to absorb relative pitching movement of the hulls.

2. A catamaran boat comprising twin hulls arranged in spaced parallel relation, said hulls being completely watertight and adapted to float on their sides as well as in their normal floating attitudes, means connecting the hulls including hinge means, a cable drum mounted between the hulls upon the means connecting said hulls, a pair of cables wound upon said drum with one cable going to the bottom of one hull and the other cable going to the bottom of the other hull, whereby the winding of the cables upon the drum pulls the bottoms of the hulls toward one another into folded position in which the hulls are bottom to bottom.

3. A catamaran boat comprising two hulls arranged in spaced parallel relation, laterally rigid means disposed between said hulls at at least two places spaced longitudinally of the hulls, hinge means connecting the ends of said laterally rigid means to the respective inboard sides of said hulls at their upper edges to permit one hull to pitch relative to the other, tension members extending between the hulls below and in spaced parallel relation to said laterally rigid means, additional hinge means joining the ends of the respective tension members to the hulls to permit one hull to rise above the other, and a hinge in the center of each tension member to permit one hull to roll outwardly with respect to the other and to permit said hulls to be folded into positions in which they are bottom to bottom.

4. A catamaran comprising a pair of hulls which are completely watertight such that they are adapted to float on their sides as well as in normal attitudes, a frame member having the two opposite ends thereof hinged to the inboard sides of the respective hulls such that the hulls may be swung into positions in which they are bottom to bottom, a wheel projecting beyond the outboard side of each hull of the pair, and means to pull the hulls while they are afloat into positions in which they are bottom to bottom so that the catamaran may be pulled from the water on said wheels.

References Cited in the file of this patent

UNITED STATES PATENTS

| | | |
|---|---|---|
| 1,352,318 | Sesty | Sept. 7, 1920 |
| 1,602,812 | Cook | Oct. 12, 1926 |
| 2,282,745 | Preston | May 12, 1942 |
| 2,341,166 | Todd | Feb. 8, 1944 |
| 2,342,535 | Frova | Feb. 22, 1944 |
| 2,365,830 | Miller | Dec. 26, 1944 |
| 2,588,084 | Bushfield | Mar. 4, 1952 |
| 2,712,293 | O'Higgins | July 5, 1955 |
| 2,850,747 | Bouchard | Sept. 9, 1958 |
| 2,851,705 | Smith | Sept. 16, 1958 |
| 2,914,016 | Sweeny | Nov. 24, 1959 |
| 2,917,754 | Gunderson | Dec. 22, 1959 |

FOREIGN PATENTS

| | | |
|---|---|---|
| 859,415 | Germany | Dec. 15, 1952 |